United States Patent [19]

Russ et al.

[11] 4,398,178

[45] Aug. 9, 1983

[54] APPARATUS FOR TRANSMITTING INFORMATION ON AN ALTERNATING CURRENT LINE

[75] Inventors: Arild Russ, Masvägen; Pehr-Olof G. Sjöstrand, Barrstigen; Ingvar P. Sternberg, Fugavägen; Lars G. S. Lindberg, Mariedalsvägen, all of Sweden

[73] Assignee: Handelsbolaget Light Regulation, Sweden

[21] Appl. No.: 136,791

[22] Filed: Apr. 3, 1980

[30] Foreign Application Priority Data

Apr. 12, 1979 [SE] Sweden .................. 7903295

[51] Int. Cl.³ .............................. H04B 3/54
[52] U.S. Cl. ............................ 340/310 A; 307/3; 340/825.62
[58] Field of Search ........ 340/310 A, 310 R, 310 CP, 340/151, 163, 167 R, 171 R, 170, 870.01, 825.06, 825.57, 825.62, 825.7, 825.71; 307/3, 140

[56] References Cited

U.S. PATENT DOCUMENTS

| | | | |
|---|---|---|---|
| 3,488,517 | 1/1970 | Cowan et al. | 340/310 R |
| 3,714,451 | 1/1973 | Whitney et al. | 307/3 |
| 3,721,830 | 3/1973 | Oishi et al. | 340/310 R |
| 3,818,466 | 6/1974 | Honda | 340/310 R |
| 4,024,528 | 5/1977 | Boggs et al. | 340/310 A |
| 4,131,882 | 12/1978 | Hollagaugh et al. | 340/310 A |
| 4,200,862 | 4/1980 | Campbell et al. | 340/310 A |

FOREIGN PATENT DOCUMENTS

| | | |
|---|---|---|
| 660178 | 4/1938 | Fed. Rep. of Germany . |
| 713249 | 10/1941 | Fed. Rep. of Germany . |
| 716969 | 1/1942 | Fed. Rep. of Germany . |
| 763437 | 1/1945 | Fed. Rep. of Germany . |
| 1638473 | 6/1971 | Fed. Rep. of Germany . |
| 117816 | 12/1946 | Sweden . |
| 1153908 | 6/1969 | United Kingdom . |
| 1244608 | 9/1971 | United Kingdom . |
| 1358074 | 6/1974 | United Kingdom . |
| 1519058 | 7/1978 | United Kingdom . |
| 1520269 | 8/1978 | United Kingdom . |
| 2005118 | 4/1979 | United Kingdom . |

*Primary Examiner*—James J. Groody
*Attorney, Agent, or Firm*—Kenway & Jenney

[57] ABSTRACT

In a system for transmitting information on an a.c. line from a transmitter unit to a receiver unit which is connected to the line at a great distance from the a.c. source supplying said line than the transmitter unit, information is transmitted on one of the phase conductors of the line in a form of a series of short-duration pulse-like amplitude reductions in the alternating voltage waveform on said phase conductor during one and the same half cycle of the waveform, whereat the pulses are mutually arranged in the pulse series to form a binary code word representing the desired information. The short-duration pulse-like amplitude reductions in the alternating voltage waveform are generated by means of a current transformer (14), whose primary winding is connected in series with the phase conductor (4) and whose secondary winding is short circuited by means of a switching transistor (15) controlled by a control unit (6) to be opened for a short duration for each desired pulse in the series of information pulses. When the transistor (15) is opened, a voltage regulator (17) connected across the secondary winding of the transformer restricts the change in magnetic flux in the transformer core to a maximum value dependent upon the length of the pulse series. A current regulator (27) is arranged to sense the current flowing through the phase conductor and the primary winding of the current transformer and, by connecting a load (28) to the phase conductor (4) on the side of the current transformer remote from the a.c. source (1), to hold the current through the primary winding of the current transformer over a given minimum value during the half cycle of the alternating voltage waveform when a series of information pulses is to be transmitted.

13 Claims, 8 Drawing Figures

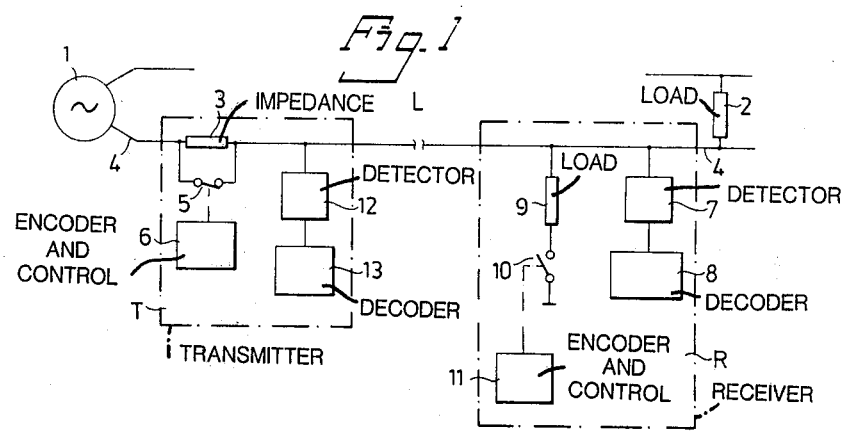
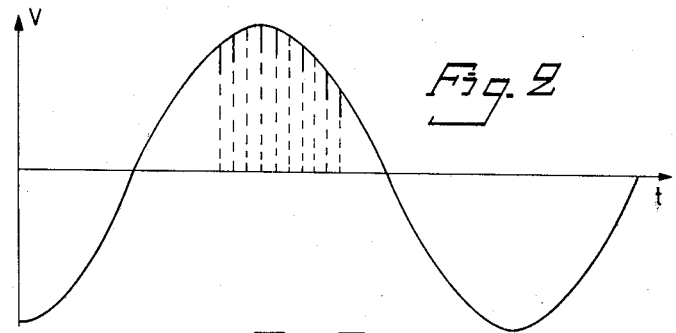
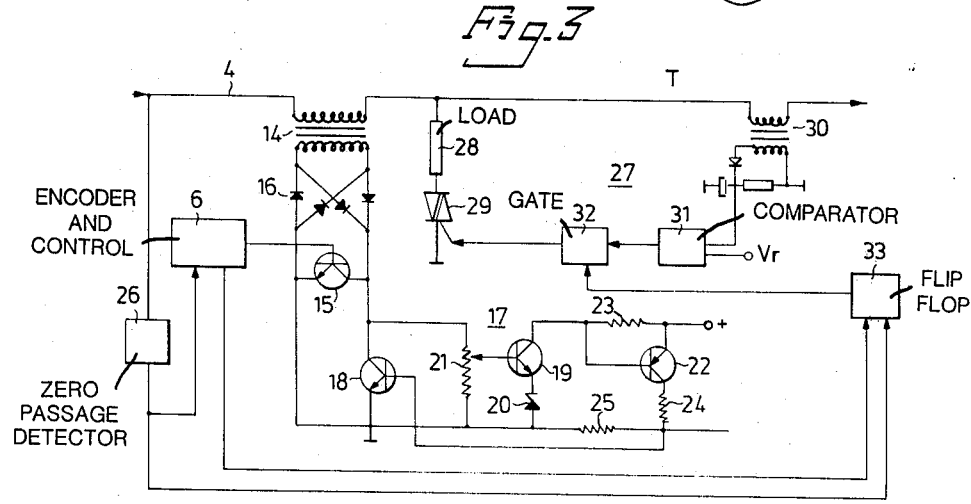

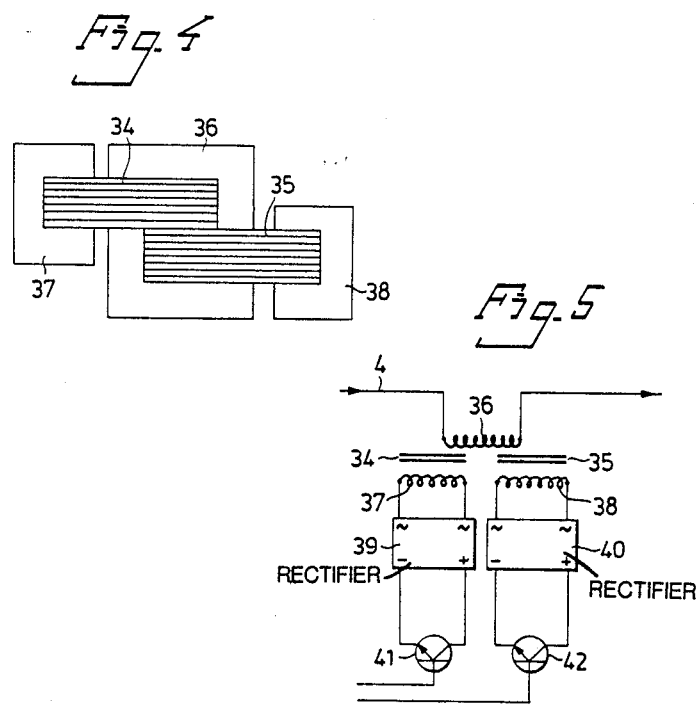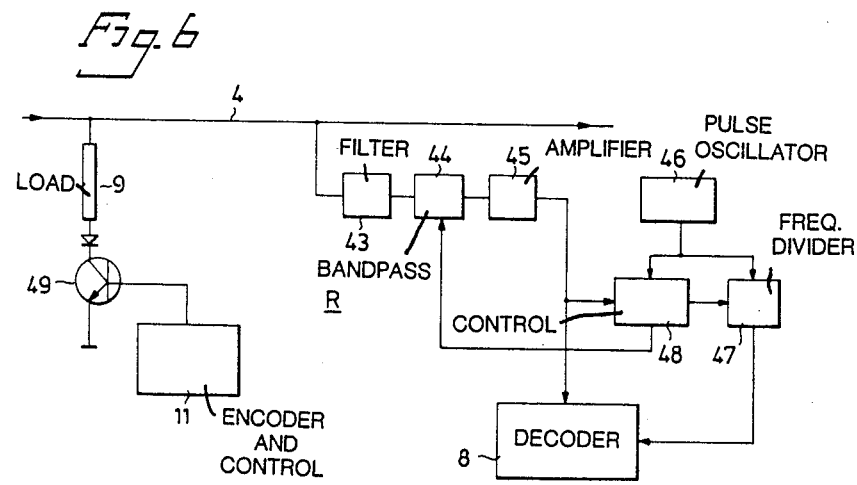

APPARATUS FOR TRANSMITTING INFORMATION ON AN ALTERNATING CURRENT LINE

The present invention relates to a system for transmitting information on an a.c. line, primarily in the energy-transmission direction of said line, i.e. from a transmitter unit connected to said line to a receiver unit which is connected to the line at a greater distance from an a.c. source supplying said line than the transmitter unit.

Several different systems are known for transmitting information over an a.c. net, for example for remote control, remote monitoring purposes, remote measuring purposes and data transmission. Thus, systems are known in which a carrier frequency, e.g. a frequency within the range of 5–300 kHz, modulated with the desired information is transmitted on the a.c. line. In other systems, so-called "ripple control" systems, information is transmitted with the aid of non-modulated or pulse-code modulated carrier wave frequencies in the order of 0.1–1.5 kHz. In other systems, the waveform of the actual alternating current wave or alternating voltage wave on the line itself is modified in a manner characteristic of the desired information. In a special kind of this last mentioned type of systems, sometimes called "voltage dip carrier" systems, signalling is effected through a tempory reduction of the amplitude of the alternating voltage wave on the line. With such known systems, in the majority of cases this temporary reduction in amplitude in the alternating voltage wave is effected by temporarily coupling, in the transmitter unit located in the vicinity of the a.c. sourse, a short circuit or a large load in parallel across the a.c. source. One serious disadvantage herewith is that the power level of the transmitter must be of such magnitude that the amplitude reduction in the voltage waveform obtained on the line can be positively detected at a receiver connected to said line at a considerable distance from the transmitter unit and often in the vicinity of a load supplied through the line, which load, for example, shall be operated on the basis of the transmitted information. Known systems of this kind are also often encumbered with a very low transmission rate, so that several tens of seconds are required to transmit even simple information.

Consequently, the object of the present invention is to provide an improved system for transmitting information on an a.c. line from a transmitting unit connected to the line to a receiving unit which is connected to the line at a greater distance from the a.c. source feeding the line than is the transmitting unit, by temporary reduction of the amplitude of the voltage waveform on the line in agreement with the information to be transmitted, said system requiring less power and enabling a considerably higher transmission rate to be obtained than present day systems. A further object of the invention is to provide a system which is simple and relatively inexpensive, so as to be practically and economically useful for transmitting information to a large number of receivers, for example for operating a large number of separate loads connected to the a.c. line, such as, for example, street lamps, electrical heating apparatus in a dwelling area, tariff switches for electricity meters in electricity distributing systems or the like. In a system according to the invention, the receiver units are suitably also capable of transmitting information on the a.c. line, in response to orders from the transmitter unit, back to said transmitter unit, e.g. for verifying the receipt of information transmitted by the transmitter unit, or for re-transmitting measurement values, or for transmitting information concerning the state of apparatus or loads with which the receivers are associated.

The system according to the invention is primarily characterized in that the transmitter unit comprises an impedance element connected in series with one of the conductors of the a.c. line and controlled short-circuiting means connected across said impedance element. The short-circuiting means are controlled by a control unit in response to the information which is to be transmitted, so as to be caused to interrupt the short-circuiting of the impedance element briefly in a selective combination of a plurality of time positions located at mutually constant time intervals within a single half cycle of the alternating voltage waveform on the conductor and with uncharged direction of the current flow through the conductor, in a manner such that during said half cycle of the voltage waveform a series of transient amplitude reductions is produced in the voltage wave in conformity with a binary code word representing the information.

In a preferred embodiment of the invention the impedance element comprises a current transformer having a primary winding connected in series with the conductor of the a.c. line and a secondary winding, across which a switching transistor is connected so as to form the short-circuiting means for the impedance element.

Preferably, a voltage regulator is connected across the current transformer for limiting, when the short-circuiting of the transformer is briefly interrupted, the flux changes in the iron core of the transformer to a maximum value.

Further, a current regulator is preferably arranged to maintain the current flowing through the impedance element during a half-cycle, within which transient amplitude reductions are generated in the voltage waveform, above a given minimum value by connecting a controlled load to the conductor of the a.c. line on the side of the impedance element remote from the a.c. source supplying the line.

Because, in the system according to the invention, the information-carrying signal comprises pulse-like reductions of short duration in the amplitude of the voltage waveform on the a.c. line, which amplitude reductions are generated by means of a normally short-circuited impedance element connected in series in one of the conductors of the a.c. line, the short-circuiting of which impedance element can be briefly broken for each pulse-like amplitude reduction, it is possible to provide a transmitter unit with lower power requirements, and, despite this, to generate well-defined transient amplitude reductions in the voltage wave which can be detected with sufficient reliability even over long distances. When according to a preferred embodiment, the short-circuited impedance element is in the form of a current transformer connected in series to a conductor of the a.c. line, the secondary winding of which transformer is short circuited by means of a switching transistor, it is also possible to generate a relatively large number of short-duration pulse-like amplitude reductions within one and the same half cycle of the alternating voltage waveform on the line, thereby enabling a relatively large volume of information to be transmitted within the space of a single half cycle.

So that the invention will be more readily understood and further advantageous features thereof made apparent, an examplary embodiment of the invention will now be described with reference to the accompanying drawings, in which FIG. 1 is a block schematic of a system according to the invention;

FIG. 2 is a diagram illustrating the voltage waveform on the a.c. line, showing an example of an information signal generated in a system according to the invention;

FIG. 3 shows in somewhat more detail a circuit diagram for an advantageous embodiment of a transmitter unit for a system according to the invention;

FIG. 4 illustrates schematically a particular embodiment of a current transformer in the transmitter unit;

FIG. 5 is a circuit diagram of a part of the transmitter unit using a current transformer according to FIG. 4;

FIG. 6 is a somewhat more detailed circuit diagram of an embodiment of the receiver unit in a system according to the invention;

Figure 7:
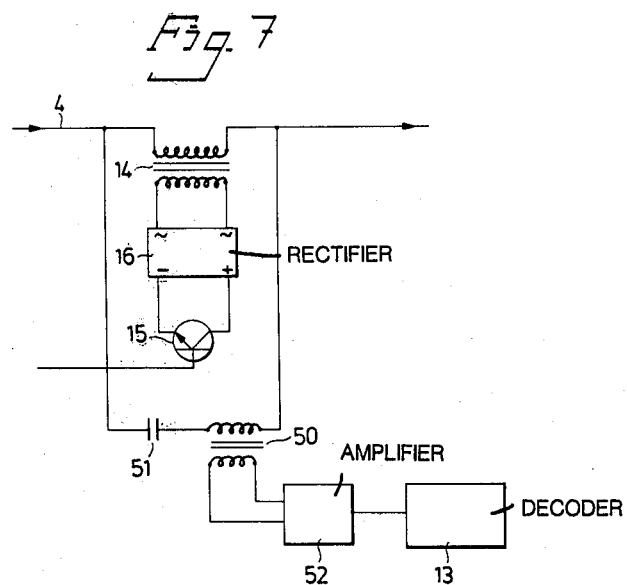
FIG. 7 is a principle circuit diagram of a first embodiment of a detector means in the transmitter unit, for receiving current pulses transmitted from the receiver unit.

FIG. 1 shows very schematically the principle structure of a system according to the invention, for transmitting information on an a.c. line L, which is supplied from an a.c. source 1, for example a transformer station, and supplies a.c. energy to one or more loads 2, of which only one is schematically shown in the drawing. The system for transmitting information on the a.c. line L includes a transmitter unit, generally referenced T, and a receiver unit, generally referenced R, said receiver unit being connected to the line L at a greater distance from the current source 1 than the transmitter unit T. The transmission of information is primarily effected in the same direction as the transfer of a.c. energy on the line L. For example, the receiver R may be arranged in the vicinity of a load 2, which shall be operated by the receiver unit R in accordance with information obtained from the transmitter unit T. The load 2 may, for example, comprise a street lamp which can be switched on and off in response to instructions received from the transmitter unit T.

In accordance with the invention, the transmitter unit T includes an impedance element 3 which is coupled in series with one of the phase conductors 4 of the a.c. line L. The impedance element 3 is connected in parallel with a switch 5 which is normally closed and which short circuits the impedance element 3, but which in response to a control unit 6 can be opened briefly, so as to interrupt the short circuiting of the impedance element 3. Provided that a load current flows through the phase conductor 4, and therewith the impedance element 3, when the switch 5 is briefly opened by the control unit 6, a voltage drop occurs across the impedance element 3, and therewith a short-duration, pulse-like, transient amplitude reduction in the alternating voltage waveform on the phase conductor 4, which pulse-like reduction can be detected by the receiver unit R. In accordance with the invention, transmission of information from the transmitter unit T is effected in a manner such that the control unit 6 opens the switch 5 briefly a plurality of times during one and the same half cycle of the alternating voltage waveform on the phase conductor 4, so that a series of pulse-like amplitude reductions are obtained in said half cycle of the voltage wave. The control unit 6 is so programmed that it can open the switch 5 a given maximum number of times during said half cycle with a predetermined constant time interval between the different time positions in which the switch 5 can be opened. The control unit 6 can selectively open the switch 5 in each of said time positions, so that a pulse-like amplitude reduction is obtained in the voltage wave, or can refrain from opening said switch 5, so that no reduction in amplitude is generated. Thus, there can be transmitted a series of pulse-like amplitude reductions corresponding to a binary code word having a given number of bits, in which binary code word each pulse-like amplitude reduction may represent a binary "1", while the absence of such amplitude reduction represents a binary "0". During the half cycle in question of the voltage waveform on the phase conductor 4 there is thus obtained a series of pulses of the kind illustrated by way of example in the diagram in FIG. 2, representing the desired information, said diagram showing part of the voltage waveform on the phase conductor 4 with a half cycle during which a series of information pulses is transmitted. It has been assumed here that the transmitted binary code word has ten bits, and in the illustrated embodiment a series of pulses has been generated corresponding to the binary code word 1101101011. An information-transmitting system according to the invention can, of course, also be constructed to transmit pulse series including both a smaller and a larger number of bits. It has been found that with a transmitter unit of suitable design, as more clearly explained hereinafter, it is possible to transmit without difficulty a pulse train having a length of more than 15 bits during one and the same half cycle of the voltage waveform. Each pulse-like amplitude reduction may, for example, have a length of 100 $\mu$s, whereas the intervals between two sequential pulses may have a length of for example 200 $\mu$s, so that a series of information pulses including 15 bits has a total length of 4.5 ms, which is well accommodated within a half cycle of the voltage waveform. By means of an information pulse series having a length of, for example, 15 bits, it is possible within the space of a single half cycle to transmit a relatively large volume of information. Such a message of 15 bits could, for example, contain a start part of 3 bits indicating the type of message in question, a subsequent address part of 8 bits, by means of which it would be possible, for example, to obtain 15 different group call addresses and 255 different individual addresses to different receiver units, and an information part of 4 bits, which could enable 15 different commands to be transmitted to the receiver units.

In order to have time to transmit a pulse series of 15 bits in the space of one half cycle, the transmission frequency, i.e. the mutual time distance between the pulses, must be selected with respect to the damping of the a.c. line in question. Consequently, it may be convenient for the control unit 6 of the transmitter unit T to be so designed that the repitition frequency of the series of information pulses can be changed to different values.

Conveniently the transmitter unit T includes zero passage detectors arranged to detect the zero passages of both the alternating voltage waveform and the alternating current waveform on the phase conductor 4, so that the control unit 6 can initiate transmission of the desired series of information pulses at such a time-distance from the zero passage of the voltage waveform that it is ensured that pulses will be generated during a part of the half cycle of the voltage waveform during which there is also sufficient current of unchanged direction on the phase conductor 4, irrespective of the prevailing phase angle between voltage and current on the phase conductor 4. Possible embodiments of the control unit 6 for controlling the switch 5, for transmitting a series of information pulses of the aforedescribed kind, are well known to the art and will not therefore be described in detail. It should be mentioned, however, that the control unit 6 will, of course, contain a suitable register which can be charged with binary code words corresponding to the information to be transmitted, and a clock for determining the mutual time interval between the different pulses in the information series.

The receiver unit R includes detector means 7 which are connected to the same phase conductor 4 in the a.c. line L as the transmitter unit T, and which are arranged to detect the series of pulse-like amplitude reductions occurring in the alternating voltage waveform and transmitted from the transmitter unit T. The detector means 7 send the detected pulse series to a de-coding unit 8 which processes the series of pulses in a suitable manner, to evaluate its information content. Suitable embodiments of such de-coding units 8 for evaluating a binary coded pulse-series are well known in the art and will not be described in detail here.

In the case of an information-transmission system of the kind according to the invention, it is generally desirable that information can also be sent back in the opposite direction, from the receiver unit R to the transmitter unit T. More specifically, some form of the receipt should be given to the transmitter unit T, i.e. an acknowledgement that the receiver unit R has received a message sent by said receiver unit T, and normally a re-transmission of said message received in the receiver unit R for control in the transmitter unit T that the originally transmitted message has been received in its correct form. It may also be desirable to transmit data from the receiver unit R to the transmitter unit T concerning, for example, measuring values or information about the state of the load 2, the receiver unit R being requested for such information by the transmitter unit T.

For the purpose of enabling information to be transmitted in an opposite direction, the receiver unit R includes information transmitting means in the form of a load 9, which can be connected to the phase conductor 4 by means of a switch 10, said switch being arranged to be briefly closed a plurality of times by a control unit 11 during a half cycle of the alternating voltage waveform on the phase conductor 4 in a manner corresponding to that described above with reference to the transmission of information from the transmitter unit T. For each brief closure of the switch 10, there is generated in the phase conductor 4 a current pulse of short duration, and thus there is obtained a series of current pulses during the half cycle in question of the alternating voltage wave, which series may have a similar structure to the aforedescribed. The repitition frequency of this series of current pulses is suitably the same as the repitition frequency of the pulse series transmitted by the transmitter unit T, and transmission from the receiver unit R can advantageously be effected during that half cycle of the voltage waveform which follows immediately after the half cycle during which information is transmitted from the transmitter unit T.

For detecting the series of current pulses transmitted in the aforedescribed manner from the receiver unit R, the transmitter unit T is provided with a detector unit 12 which is connected to the phase conductor 4 and which passes the detected pulse series to a de-coding unit 13, in which the information content of the pulse series is evaluated in a conventional manner.

FIG. 3 illustrates schematically an exemplary embodiment of the parts of the transmitter unit T serving to transmit information in the form of a series of pulse-like amplitude reductions in the voltage waveform on the phase conductor 4. The impedance element 3 in FIG. 1 is a current transformer 14 whose primary winding is connected in series with the phase conductor 4. The switch 5 in FIG. 1 comprises a switching transistor 15 which is connected across the secondary winding of the current transformer 14 via a full-wave rectifier 16. The transistor 15 is normally conductive and functions to short circuit the secondary winding of the transformer 14, but can be briefly opened by the control unit 6. By connecting the transistor 15 to the secondary winding of the transformer 14 through a full-wave rectifier 16, a single transistor can be used for controlling the transformer 14 during both half cycles of the a.c. wave, as will be more clearly described hereinafter.

When the transitor 15 short-circuits the secondary winding of the transformer 14, the impedance of its primary side is very low, and therewith also the voltage drop across the primary winding. When the secondary winding is short-circuited, the magnetic field in the transformer core is practically zero, but increases when the transistor 15 is briefly opened by control unit 6. This results in an increase in the inductance of the primary winding of the transformer, and there is obtained across the primary winding a voltage drop which provides the desired transient amplitude reduction in the alternating voltage waveform on the phase conductor 4. When the transistor 15 is again made conductive, the voltage drop across the primary winding of the transformer 14 ceases.

When using a current transformer in this way, a particular problem is encountered in so much as the transformer core strives to become saturated when the transistor 15 is non-conductive, since the rapid interruption of current flow in the secondary winding causes that part of the current in the primary winding which is no longer compensated by current in the secondary winding to urge the field in the transformer core towards saturation. Because the interruption is of short duration, there is created in the transformer core, however, a field displacement, such that only a relatively thin outer layer of each lamella of the core is magnetized to saturation. When the secondary winding is then again short circuited, this layer of the transformer core, which has been magnetized to saturation, will return to a remance value which lies much higher than the magnetization of the layer in question prior to interruption of the short circuiting of the secondary winding, i.e. prior to the pulse just generated. This part of the transformer core thus becomes less accessible for the requisite magnetization of the core at the next interruption of the short-circuiting of the secondary winding, i.e. for the generation of the next pulse in the series of pulses. Consequently, when generating this pulse, a new layer of the lamellae of the transformer core will be magnetized to saturation and, upon termination of the pulse, returned to a high remanence value in the manner described. Thus, for each pulse generated, a progressively larger part of transformer core is given a high remanence value. As will be understood, it must be ensured that there is a sufficient amount of iron in the transformer core for said core to be able to generate the maximum number of desired pulses in a pulse series, e.g. 15, since otherwise the magnitude of the pulses generated will become progressively smaller rod the last pulses in the series may drop away.

The aforementioned problem can be partially solved by selection of the material in the transformer core and of the number of lamellae present and the thickness thereof, so that a sufficient amount of non-remanent iron remains in the transformer core at the end of a pulse series, in order to maintain the short circuiting flux, and further by limiting the degree of magnetization in the core for each pulse generated, so that all pulses will be of equal magnitude, which is desirable with respect to positive detection of pulses in the receiver unit. In the embodiment of the receiver unit T illustrated in FIG. 3, this limitation is effected by use of a voltage regulator, generally shown at 17, which automatically limits the voltage drop across the secondary side of the transformer 14, and therewith also across the primary side thereof, when the transistor 15 is opened. Limiting the voltage also limits the flux changes, and therewith the degree of magnetization. This voltage regulator 17 includes a switching transistor 18 which is connected in parallel across the signalling transistor 15, and a transistor 19 which is connected in series with a zener diode 20 and whose base is connected to a potentiometer 21 coupled in parallel across the transistor 18. The voltage regulator also includes a third transistor 22 and resistors 23, 24 and 25. The transistors 18, 19 and 22 are normally non-conducting. When the signalling transistor 15 is opened and the voltage across the secondary winding of the transformer 14, and therewith across the transistor 18 of the voltage regulator 17, increases and reaches a given value, which can be set by means of the potentiometer 21, the transistor 19 begins to be conductive, causing the transistor 22 also to become conductive, said transistor 19 normally being kept non-conductive by the bias obtained through the zener diode 21. In this way, the point between the two resistors 24 and 25 goes positive, and hence the transistor 18 begins to conduct, so that the voltage across the secondary winding of the transformer 14 is restricted to said set value. Because of the voltage regulator, the magnitude of the generated voltage pulses is also independent of the magnitude of the load current flowing through the phase conductor 4 during the generation of said pulses.

Since, as before described, the iron core of the transformer 14 will be partially saturated at the end of a half cycle, during which a series of pulses has been sent, the iron must be re-magnetized in order to be re-available for magnetization. To this end, the control unit 6 is arranged to open the switching transistor 15 for a sufficiently long period of time, e.g. some milliseconds, during the half cycle of the voltage waveform which follows a half cycle during which a pulse-signalling operation has taken place, so as to ensure complete re-magnetization of the iron core.

It will be seen from the aforegoing that pulses can only be generated when current flows through the phase conductor 4. For this reason, as previously mentioned, the generation of pulses is conveniently first started at such a time distance from the zero passage before the half cycle in question of the alternating voltage waveform, that the requisite current flows through the phase conductor 4 during the generation of pulses, irrespective of the phase angle between voltage and current. To this end, the transmitter unit T suitably includes zero passage detectors 26 for the voltage and curent waveforms, said zero passage detectors governing the control unit 6.

If, however, no load is coupled to the phase conductor 4, or if the load coupled thereto is very small, it is possible that the load current flowing through the phase conductor 4 is too small to generate voltage pulses of the requisite amplitude. In the embodiment of a transmitter unit T according to the invention illustrated in FIG. 3, this problem is solved by means of a current regulator generally referenced 27. This current regulator includes a load 28 which can be coupled to the phase conductor 4 on the side of the current transformer 14 remote from the a.c. source by means of a triac 29. The current regulator 27 also includes a current transformer 30, whose primary winding is coupled in series with the phase conductor 4, and is thus through-passed by the current thereon, and whose secondary winding provides a voltage proportional to said current. This voltage is rectified and filtered and passed to a voltage comparator 41, in which it is compared with a reference voltage $V_r$. Provided the voltage from the transformer 30 exceeds the reference voltage, i.e. sufficient load current flows through the phase conductor 4, the voltage comparator 31 has an output voltage of such low amplitude that it is insufficient to open the triac 29 and connect the load 28 to the phase conductor 4. If the current in the phase conductor 4 drops beneath a value corresponding to the reference voltage $V_r$, the voltage comparator 31 changes its state and provides a high output signal, which is applied to the triac 29 through a gating circuit 32, so that said triac connects the load 28 to the phase conductor 4, whereby the requisite current for generating pulse signals is obtained through the primary winding of the transformer 14. To prevent unnecessary connection of the extra load 28 and to ensure that said load is only connected when signals are to be sent, the gating circuit 32 is controlled by a flip-flop 33 which receives a signal from the voltage zero passage detector 26 and a signal from the control unit 6, so that the flip-flop 33 opens the gating circuit 32 at the beginning of any half cycle during which the control unit 6 is programmed to transmit a series of pulses.

As will be understood from the aforegoing, the iron core of the current transformer 14 will already be saturated after a smaller number of signal pulses, if a greater pulse amplitude, and therewith a higher magnetization of the iron in the transformer core, is desired. In order to be able to obtain a large number of pulses, i.e. an information word containing many bits, and at the same time a high pulse amplitude, a current transformer 14 of particular design can be used to advantage. Such a transformer is schematically illustrated in FIG. 4. The current transformer of this embodiment has two magnetically separate iron cores 34 and 35, both of which are commonly encircled by the primary winding 36 of the transformer, but each of which has a respective secondary winding 37 and 38. As schematically illustrated in FIG. 5, the current transformer is coupled to the phase conductor 4 through its primary winding 36, as already described. The secondary windings 37 and 38 arranged on their respective iron cores 34 and 35 are each connected through a respective rectifier 39 and 40 across a respective switching transistor 41 and 42, which correspond to the signalling transistor 15 in FIG.

3 and which thus are normally conductive and short circuit the secondary winding 37 and 38. The two transistors 41 and 42 are both controlled by the control unit 6 (FIG. 1) in a manner such that they are opened alternately, for interrupting the short circuiting of the associated secondary winding 37 and 38 respectively at each alternate pulse in the transmitted series of pulses. In this way, each core 34 and 35 in the current transformer needs only handle half the number of pulses in the generated pulse series.

FIG. 6 illustrates the construction of the receiver unit R in more detail. The receiver unit R is arranged to receive the series of pulse-like amplitude reductions transmitted by the transmitter unit T in the alternating voltage waveform on the phase conductor 4, and for transmitting information in a reverse direction to the transmitter unit T in the form of series of current pulses. The detector means for detecting the pulse-like amplitude reductions in the alternating voltage wave can, as schematically illustrated in FIG. 6, include a filter 43 for eliminating the 50 Hz signal on the phase conductor 4, a bandpass filter 44 adapted to the pulse frequency of the pulse series, and suitable circuits 45 for amplifying and shaping the detected pulses. The detected series of pulses is passed to the de-coding unit 8 in the manner previously described. For the purpose of processing the detected pulse series in the de-coding unit 8, there is required a clock-pulse series which has the same repetition frequency as the pulse series. In accordance with a particularly advantageous embodiment of the invention, this clock-pulse series is generated by means of a pulse oscillator 46 arranged in the receiver unit R and having a substantially higher frequency than the frequency of the series of information pulses. The frequency of the oscillator 46 is divided down, by means of a frequency-dividing circuit 47, to the requisite clock-pulse series for the de-coding unit 8. So that the oscillator 46 need not be extremely stable with respect to its frequency, and in order to enable the repitition frequency of the series of information pulses to be changed to different values in the transmitter unit T, as aforementioned, the frequency divider 47 is controllable so that its divisor is automatically set to give the correct clock-pulse frequency to the de-coding unit 8. This is achieved by also sending the output pulses of the oscillator 46 to a counter 48, which is controlled by the first two pulses in the received detected series of information pulses, and which is arranged to count the number of pulses from the oscillator 46 between said two sequential pulses in the series of information pulses. In turn, the frequency divider 47 is so controlled by the counter 48 that it divides the the frequency of the oscillator 46 by said number of pulses counted by the counter 48. In this way, the clock-pulse frequency for the de-coding unit 8 automatically becomes identical with the repetition frequency of the received series of information pulses, irrespective of any variations in the frequency of the oscillator 46 and irrespective of any changes in frequency of the series of information pulses.

The frequency range of the bandpass filter 44 is suitably adapted to the frequency content of the received series of information pulses, and said bandpass filter is suitably of a kind whose frequency range can be displaced, this being effected automatically in response to the number of pulses from the oscillator 46 counted in the counter 48. In this way, the frequency range of the bandpass filter 44 can be displaced to a suitable position with respect to the frequency content in question of the series of information pulses received.

The receiver unit may be constantly open for receipt of series of information pulses from the transmitter unit T. In order to render the receiver unit R less sensitive to disturbances, the unit can also be constructed so that during each half cycle in which information can be transmitted from the transmitter unit T, it is only opened when the first pulse in a transmitted series of information pulses can be expected to arrive and is then only held open for a short period of time at those time positions in which the further pulses in a series of received information pulses can arrive.

FIG. 6 also shows the load 9 which can be connected to the phase conductor 4 by means of a switching transistor 49 (switch 10 in FIG. 1) controlled by the control unit 11, for transmitting information on the phase conductor 4 to the transmitter unit T in the form of a series of current pulse during a half cycle of the voltage waveform on the phase conductor 4.

For the purpose of receiving the series of current pulses transmitted from the receiver unit R, the transmitter unit T includes a detector unit 12 of the kind described with reference to FIG. 1. This detector unit 12 may, in a conventional manner, simply comprise a current transformer whose primary winding is connected into the phase conductor 4 and whose secondary winding is connected to a suppression filter for 50 Hz, and additional circuits for filtering, amplifying and shaping the received series of current pulses, FIGS. 7 and 8, however, illustrate two alternative embodiments of detector means 12 in the transmitter unit T, which are arranged to provide the requisite suppression of the normal load current of 50 Hz in an advantageous manner.

The detector means schematically illustrated in FIG. 7 includes a current transformer 50, whose primary winding is connected in series with a capacitor 51 and connected to the phase conductor 4 in parallel across the signalling transformer 14 (see FIG. 3). Since the signalling transistor 15 is normally closed, the primary winding of the transformer 14 has a very low impedance and shunts strongly the capacitor 51. Thus the transformer 50 cannot detect any current pulses present on the phase conductor 4. Transmission of a series of current pulses from the receiver unit R in the aforedescribed manner is therefore suitably effected during the time when the control unit 6 (FIG. 3) in the transmitter unit T opens the switching transistor 15 for reversing the iron core in transformer 14, which, as before described, takes place during the halfcycle immediately following a half cycle during which the transmitter unit T has transmitted a series of information pulses. When the transistor 15 is held opened for reversing the iron core of the transformer 14, the impedance of the primary winding of the transformer 14 is increased, and a substantial part of the current pulses transmitted from the receiver unit R and received during this time are able to pass through the capacitor 51 and the primary winding of the transformer 50, on the secondary side of which the series of current pulses is obtained and, after the requisite amplification and pulse shaping in circuit 52, is passed to the de-coding unit 13 (see FIG. 1). The high frequency current-pulse series from the receiver unit R gives a much larger current through the capacitor 51 than the normal load current of 50 Hz on the phase conductor 4.

Figure 8:
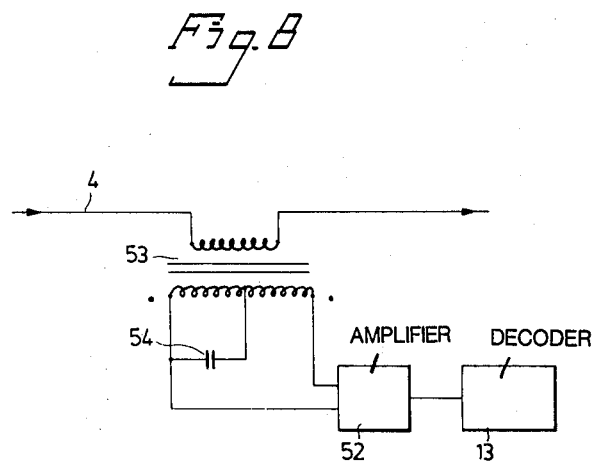
FIG. 8 is a principle circuit diagram of a second embodiment of a detector means in the transmitter unit, for receiving current pulses transmitted from the receiver unit.

The FIG. 8 embodiment of the detector unit (12 in FIG. 1) for series of current pulses transmitted from the receiver unit R includes a current transformer 53 having a primary winding connected into the phase conductor 4, and two identical secondary windings which are coupled in series with each other with opposite polarities. One of these secondary windings is bridged by a capacitor 54, which is so dimensioned that it has a very high reactance for 50 Hz, while its reactance for the frequency of the series of current pulses is low. The load current of 50 Hz is, in this way, balanced on the secondary side of the transformer 53, which, on the other hand is in imbalance for the frequency of the series of current pulses, so that the current pulses transmitted by the receiver unit R are passed to the amplifying and pulse-shaping circuits 52, and from there to the de-coding unit 13.

It will be understood that a large number of modifications and further embodiments of an information-transmitting system according to the invention are possible in addition to those described with reference to the drawings. It will also be understood that the invention can also be applied in other contexts than those previously mentioned, where the transmission of information over an a.c. line is required. The code format according to which the series of information pulses is transmitted can also, of course, be varied from case to case, depending upon the amount and the kind of information to be transmitted. The routines for exchanging messsages between the transmitting unit and receiving unit can also be formed in many different ways, depending on the reason for transmitting the information. In FIG. 2 it has been assumed that the transmission of a series of information pulses from the transmitter unit takes place during the positive half cycles of the voltage waveform, although, as will be understood, there is nothing to prevent the negative half cycles being used for this purpose instead.

We claim:

1. A system for transmitting information on an a.c. power line having at least two conductors and being connected at its one end to an a.c. power source supplying said line with alternating voltage and current, said alternative voltage having a waveform of a succession of half wave cycles,
    said system comprising a transmitter unit connected to said line and a receiver unit also connected to said line at a greater distance from said a.c. source than said transmitter unit;
    said transmitter unit including a current transformer having a primary winding inserted to series in one of said conductors and a secondary winding; controlled short-circuiting means connected across said secondary winding; encoding and control means for receiving the information to be transmitted and for encoding said information into a binary digital code and connected to said short-circuiting means for causing said short-circuiting means to open briefly and interrupt the short-circuiting of said secondary winding in a selective combination, corresponding to said binary digital code, of a plurality of time positions located at mutually constant time intervals within one and the same half cycle of the alternating voltage waveform on said one conductor and also within one and the same half cycle of the alternating current flowing through said one conductor, whereby said half cycle of the alternating voltage waveform exhibits a series of transient amplitude reductions conforming to said binary digital code; a voltage regulator connected across said current transformer for limiting, when said short-circuiting means are opened, the flux changes in the iron core of said current transformer to a maximum value; and a current regulator comprising means connected to said one conductor for sensing the alternating current flowing therethrough, means for comparing said sensed current value with a reference value, and means controlled by said comparison means for maintaining the magnetizing current of said current transformer above a given minimum value during said half cycle; and
    said receiver unit including detector means connected to said one conductor for detecting said transient amplitude reductions appearing in the alternating voltage waveform on said one conductor, and decoding means for decoding said binary digital code represented by said transient amplitude reductions.

2. A system as claimed in claim 1, wherein said means controlled by said comparison means of said current regulator for maintaining the magnetizing current of said current tansformer above a given minimum value during said half cycle of the alternating voltage waveform of said one conductor include a load controlled by said comparison means and connected to said one conductor on the opposite side of the primary winding of said current transformer as seen from said a.c. power source.

3. A system as claimed in claim 1, wherein said current transformer has two magnetically separate cores, both of which are surrounded by said primary winding and each of which is provided with a respective secondary winding, said short-circuiting means include two electronic switches connected across a respective one of said secondary windings, and said encoding and control means is connected to both said electronic switches for causing said switches to open briefly and interrupt the short-circuiting of the associated secondary winding alternately for each alternate transient amplitude reduction.

4. A system as claimed in claim 1, wherein said encoding and control means is arranged to cause said short-circuiting means to open and interrupt the short circuiting of said secondary winding during the alternating voltage and current half cycles following upon said one and the same alternating voltage and current half cycles for a sufficient length of time to re-orient remanence exhibited by the core of said current transformer at the end of said one and the same alternating voltage half cycle.

5. A system as claimed in claim 1, wherein said short-circuiting means include an electronic switch connected across the secondary winding of said current transformer via a full-wave rectifier.

6. A system as claimed in claim 1, wherein said transmitter unit includes zero passage detecting means for detecting the zero passages of the alternating voltage waveform and the alternating current waveform on said one conductor, said encoding and control means being responsive to said zero passage detecting means to open said short circuiting means to generate the first transient amplitude reduction in said series at a predetermined time interval after a zero passage of the alternating voltage waveform, said predetermined time interval being dependent upon the zero passage of the alternating current waveform.

7. A system as claimed in claim 1, wherein the mutual time interval between said time positions can be selectively changed.

8. A system as claimed in claim 1, wherein the receiver unit includes a pulse oscillator having a higher frequency than the repetition frequency of said series of transient amplitude reductions; a counter controlled by said detector means that receives said oscillator pulses and counts the number of said pulses between two sequentially detected transient amplitude reductions at the beginning of said series of transient amplitude reductions; and a frequency-dividing circuit controlled by said counter for dividing the pulse frequency of said pulse oscillator by said number of pulses counted by the counter, the output pulses from said frequency-dividing circuit being applied to said decoding means for controlling the de-coding process therein.

9. A system as claimed in claim 1, wherein said detector means include a bandpass filter having a frequency range which is displaced in dependence on the number of pulses counted by said counter.

10. A system as claimed in claim 1, wherein said receiver unit includes transmitting means for transmitting additional information on said a.c. power line from said receiver unit to said transmitter unit, said transmitting means comprising a load, switching means for connecting said load to said one conductor, and additional encoding and control means for receiving said additional information and encoding it into a binary digital code and connected to said switching means for causing said switching means to connect said load briefly to said one conductor at a selective combination, corresponding to said binary digital code, of a plurality of time positions located at mutually constant time intervals within a second half cycle of the alternating voltage waveform on said one conductor, said second half cycle being different from said first mentioned half cycle, whereby during said second half cycle a series of increased current pulses corresponding to said binary digital code is generated in said one conductor; and said transmitter unit includes second detector means for detecting said series of increased current pulses, and second decoding means connected to said second detector means for decoding the binary digital code represented by said detected series of increased current pulses.

11. A system as claimed in claim 10, wherein said second half cycle follows immediately after said one and the same half cycle.

12. A system as claimed in claim 10, wherein said second detector means in said transmitter unit includes a second current transformer having primary winding connected in series with a capacitor in parallel across the primary winding of the first mentioned current transformer and a secondary winding connected to said second decoding means; and said encoding and control means of the transmitter unit is arranged to hold said short-circuiting means open during said second half cycle.

13. A system as claimed in claim 10, wherein said detector means in said transmitter unit includes a second current transformer having a primary winding connected in series with said one conductor, and two identical secondary windings connected together in series with opposite polarities, a capacitor connected in parallel across one of said two identical secondary windings, said capacitor having a reactance much higher for the frequency of said a.c. power source than for the frequency of said increased current pulses; said second decoding means being connected to receive signals occurring across the series connection of said two identical secondary windings.

* * * * *

UNITED STATES PATENT AND TRADEMARK OFFICE
CERTIFICATE OF CORRECTION

PATENT NO. : 4,398,178
DATED : August 9, 1983
INVENTOR(S) : Arild Russ et al.

It is certified that error appears in the above-identified patent and that said Letters Patent are hereby corrected as shown below:

Column 7, line 7, "rod" should be --and--;

Column 11, line 51, "to" should be --in--;

Column 13, line 17, "de-coding" should be --decoding--;

Column 13, line 33, before "binary" insert --transmitter means--;

Column 14, line 2, before "binary" insert --transmitter means--;

Column 14, line 7, before "binary" insert --transmitter means--.

Signed and Sealed this

Fifth Day of March 1985

[SEAL]

Attest:

DONALD J. QUIGG

*Attesting Officer*     *Acting Commissioner of Patents and Trademarks*